United States Patent [19]
Lee

[11] Patent Number: 4,911,520
[45] Date of Patent: Mar. 27, 1990

[54] FIBER OPTIC SWITCH AND METHOD OF MAKING SAME

[75] Inventor: Jerald D. Lee, Mendenhall, Pa.

[73] Assignee: E. I. Du Pont De Nemours and Company, Wilmington, Del.

[21] Appl. No.: 262,935

[22] Filed: Oct. 20, 1988

[51] Int. Cl.$^4$ .............. G02B 6/36; B65H 69/02; H01H 11/00; H01H 1/66

[52] U.S. Cl. .............. 350/96.20; 350/96.21; 350/320; 156/158; 156/159; 156/166; 29/622; 29/623.4; 335/154

[58] Field of Search .............. 350/96.15, 96.16, 96.17, 350/96.20, 96.21, 96.22, 96.11, 96.12, 96.34, 320; 156/158, 159, 160, 161, 166; 29/622, 623.4, 829; 51/326; 335/151, 154

[56] References Cited

U.S. PATENT DOCUMENTS

| | | | |
|---|---|---|---|
| Re. 31,597 | 5/1984 | Jaeschke | 335/151 |
| 3,327,262 | 6/1967 | Bongard et al. | 355/154 |
| 3,917,383 | 11/1975 | Cook et al. | 350/96.22 |
| 3,928,102 | 12/1975 | Rowe et al. | 156/158 |
| 4,146,856 | 3/1979 | Jaeschke | 335/151 |
| 4,152,043 | 5/1979 | Albanese | 350/96.20 |
| 4,189,206 | 2/1980 | Terai et al. | 350/96.20 |
| 4,220,396 | 9/1980 | Antell | 350/96.15 |
| 4,223,878 | 9/1980 | Kummer et al. | 350/96.20 |
| 4,265,513 | 5/1981 | Matsushita et al. | 350/96.20 |
| 4,303,202 | 12/1981 | Ramsey et al. | 350/96.20 |
| 4,318,587 | 3/1982 | Grassl | 350/95.20 |
| 4,337,995 | 7/1982 | Tanaka et al. | 350/96.20 |
| 4,407,562 | 10/1983 | Young | 350/96.20 |
| 4,452,507 | 1/1984 | Winzer | 350/96.20 |
| 4,490,202 | 12/1984 | Dumont | 156/166 |
| 4,512,627 | 4/1985 | Archer et al. | 350/96.20 |
| 4,514,034 | 4/1985 | Bruch | 350/96.20 |
| 4,536,058 | 8/1985 | Shaw et al. | 350/320 |
| 4,607,910 | 8/1986 | Thurenius | 350/96.20 |
| 4,610,504 | 9/1986 | Thurenius | 350/96.20 |
| 4,637,684 | 1/1987 | Tomita et al. | 350/320 |
| 4,652,081 | 3/1987 | Fatatry | 350/96.20 |
| 4,657,339 | 4/1987 | Fick | 350/96.20 |
| 4,691,985 | 9/1987 | Shank | 350/96.20 |
| 4,699,457 | 10/1987 | Goodman | 350/96.20 |
| 4,759,597 | 7/1988 | Lemonde | 350/96.20 |
| 4,807,949 | 2/1989 | Jacobi et al. | 350/96.20 |

FOREIGN PATENT DOCUMENTS

| | | | |
|---|---|---|---|
| 2918528 | 11/1980 | Fed. Rep. of Germany | 350/96.20 X |
| 61-133907 | 6/1986 | Japan | 350/96.16 X |
| 1426475 | 2/1976 | United Kingdom | 350/96.21 |
| 1520596 | 8/1978 | United Kingdom | 350/96.21 |
| 2030319 | 9/1978 | United Kingdom | 350/96.21 |

OTHER PUBLICATIONS

Witte, "Optical Tapping Element . . ." Optics Comm., Sep. 76, vol. 18, No. 4, pp. 559–562.
"Optical Engineering," vol. 19, No. 4, Jul./Aug. 1980, pp. 628 & 629.
"Bell System Technical Journal," D. L. Bisbee, Measurements of Loss Due to Offsets and End Separations of Optical Fibers, pp. 3159–3168.
"Fiber Optic systems," Pierre Halley, 1987 by John Wiley & Sons Ltd., pp. 154–157.

*Primary Examiner*—William L. Sikes
*Assistant Examiner*—Brian M. Healy

[57] ABSTRACT

A fiber optic switch has a fixed member and a movable member mounted for cantilevered movement with respect thereto. Both of the members are fabricated from borosilicate glass.

22 Claims, 9 Drawing Sheets

FIBER OPTIC SWITCH AND METHOD OF MAKING SAME

BACKGROUND OF THE INVENTION

1. Field of the Invention

The present invention relates to a switch for use in a fiber optic communications network and, in particular, to a switch for a network using single mode fibers wherein the movable and fixed members of the switch are fabricated from glass.

2. Description of the Prior Art

Telecommunication systems using fiber optic cable as the medium for transmission of information are rapidly displacing systems that use metallic wires as the transmission medium. In fabricating such systems the ability to switch light from one fiber optic cable to another is important for system operation.

Devices are known which allow the switching connection of one fiber to another. Exemplary of such devices are those described in U.S. Pat. Nos. 4,416,856 and Re. 31,579 (both to Jaeschke) and U.S. Pat. No. 4,452,507 (Winzer). Each of the switches disclosed in these patents includes magnetically responsive switching elements. U.S. Pat. No. 4,303,302 (Ramsey et al.) discloses a piezoelectric actuated switching element. U.S. Pat. No. 4,223,978 (Kummer et al.) shows a motor actuated rotatably driven switching element.

These switches are all believed to be disadvantageous, particularly when the fiber optic system is implemented using single mode fiber, because they are not capable of providing, for extended periods over a large number of operating cycles, the precise end-to-end alignment of the fibers needed to achieve a low loss connection. A magnetically responsive switching device, which must of necessity use a metallic movable switch element, is believed unable to provide the necessary long term alignment because of the susceptibility of the metallic element to creep and fatigue. A piezoelectric switch requires a source of precise actuating voltage to achieve the desired deflection of the switching element. Providing such a source may be difficult. In addition piezoelectric elements are also known to creep over time. The rotary switch arrangement is susceptible to frictional wear, which will degrade alignment over the lift of the switch.

In view of the foregoing it is believed advantageous to provide a switch for coupling optical fibers, especially single mode optical fibers, with a repeatably reproducible low insertion loss such that, once the fibers are aligned, the alignment is retained over an extended lifetime and/or over millions of operations cycles of the switch. It is also believed to be advantageous to provide a switch which uses as the switching elements a material that has surfaces readily processable to wavelength tolerances (to achieve the desired fiber-to-fiber alignment) and which is transparent to both visible and UV radiation. Both of these latter considerations enhance the manufacturability of the switch. It is believed advantageous to use a material which closely obeys Hooke's Law, has a low coefficient of thermal expansion and an isotropic expansion characteristic.

SUMMARY OF THE INVENTION

The present invention relates to a switch for coupling fiber optic cables, particularly single mode fibers, that includes a fixed an a movable member, each of which has a fiber mounted thereon. The fibers are mounted to the lateral surface of the fixed and movable members. The movable member is mounted for cantilevered movement with respect to the fixed member between a first, unactuated, position and a second, actuated, position. These positions are defined by a first and a second stop. One of the stops imposes a predetermined bias, or preload, against the movable member.

In accordance with the present invention both the movable and the fixed members are fabricated of a material that exhibits a low thermal expansion coefficient, has isotropic thermal expansion, closely obeys Hooke's Law (strain, or elongation, is proportional to the stress, or applied force; and the strain immediately returns to zero upon removal of the stress) and is transparent to both visible and ultraviolet radiation. The thermal properties of the material insure that the precise fiber-to-fiber alignment is retained over a wide range of operational temperatures. The close adherance to Hooke's Law insures that the fiber-to-fiber alignment does not degrade due to plastic creep of the movable member as it ages and/or undergoes repeated cycling. As a result of using for the switch elements a material that has these mechanical properties, the switch elements provide cycle-to-cycle positional repeatability during each operational cycle and retain the precise initial fiber alignment over an extended lifetime and/or over millions of operational cycles. The transparency of the material contributes to the manufacturability of the switch.

Consistent with the foregoing, in accordance with the present invention the switch elements are fabricated of glass, preferably a borosilicate glass.

BRIEF DESCRIPTION OF THE DRAWINGS

The invention will be more fully understood from the following detailed description, taken in connection with the accompanying drawings, in which:

FIG. 1 is a perspective view of a fiber optic switch in accordance with the present invention with the actuator and stops spaced from the switching members while

DETAILED DESCRIPTION OF THE INVENTION

Figure 1:
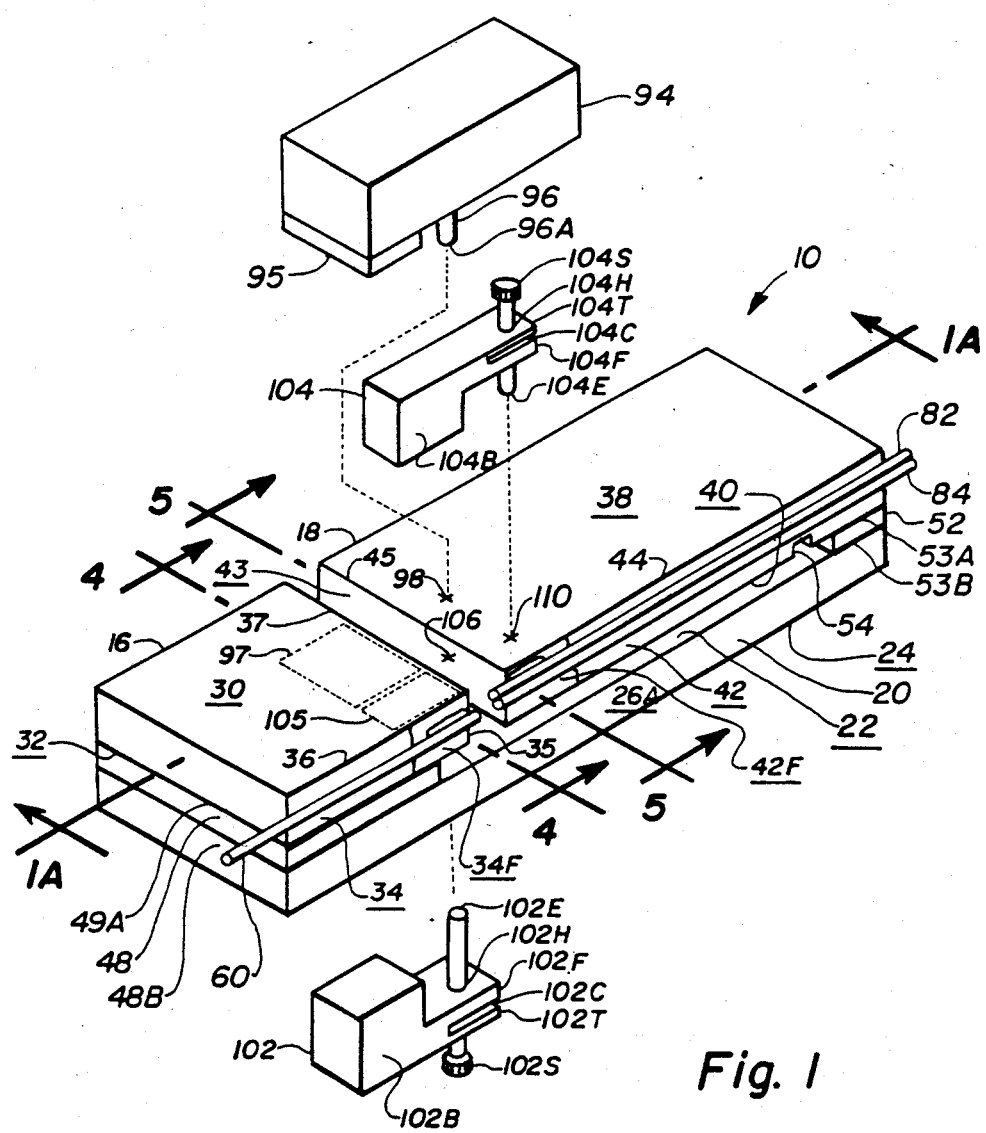

Throughout the following detailed description similar reference numerals refer to similar elements in all Figures of the drawings.

Figure 1A:
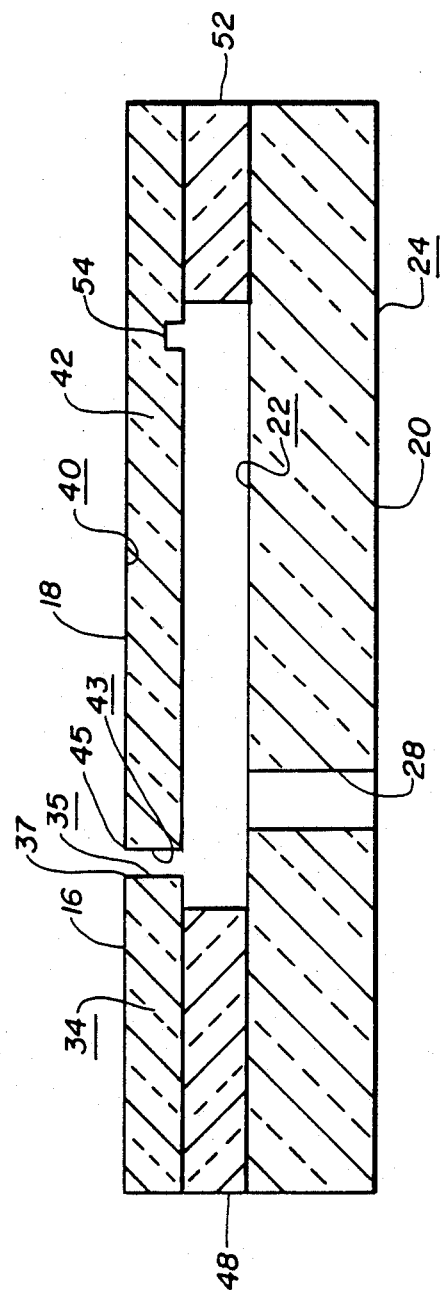
FIG. 1A is a side elevational view in section taken along section lines 1A-1A in FIG. 1.

In FIG. 1 a fiber optic switch generally indicated by reference character 10 includes a first, fixed, switch member 16 and a second, movable, switch member 18. The fixed and the movable members 16,18 are each mounted to a baseplate 20. The baseplate 20 is, in the preferred case, a generally rectanguloid member having an upper planar surface 22 and a lower planar surface 24 thereon. The upper and lower surfaces 22, 24, respectively, of the baseplate 20 are jointed by lateral surfaces 26A and 26B (FIG. 8) which define the thickness dimension of the baseplate 20. The baseplate 20 has an access opening 28 (FIGS. 1A and 8) which extends therethrough from the upper surface 22 to the lower surface 24.

The fixed member 16, in the preferred case, is also a generally rectanguloid member having an upper planar surface 30 and a lower planar surface 32. Preferably, but not necessarily, the lower surface 32 is ground and polished to an optically flat finish. These surfaces are joined by lateral surfaces of which lateral surfaces 34 and 35 are of interest. The lateral surface 34 defines the thickness of the fixed member 16. The intersection of the upper surface 30 and the lateral surface 34 forms a reference edge 36. The intersection of the surfaces 30 and 35 defines an edge 37. For a reason that will be apparent herein at least the leading portion 34F of the lateral surface 34 is ground and polished to a predetermined optical flatness. The portion 34F preferably exhibits an optical flatness of better than one wavelength. If desired the entire lateral surface 34 may be optically flat. In the preferred case the surface 34F should be as orthogonal as possible to the surface 32. Of less criticality is the orthogonality of the surface 34F to the surface 30, although it should likewise be as as orthogonal as possible thereto.

In similar fashion the movable member 18 is preferably an elongated, generally rectanguloid member having an upper planar surface 38 and a lower planar surface 40. The surfaces 38, 40 of the movable member are joined by lateral surfaces of which the lateral surfaces 42 and 43 are of interest. The lateral surface 42 defines the thickness of the movable member 18. Preferably, but not necessarily, the lower surface 40 is ground and polished to an optically flat finish. The intersection of the surfaces 38, 42 on the movable member 18 forms a reference edge 44 while the intersection of the surfaces 38 and 43 defines an edge 45. At least the leading portion 42F of the lateral surface 42 is ground and polished to a predetermined optical flatness. The portion 42F also preferably exhibits an optical flatness of better than one wavelength. The entirety of the lateral surface 42 may, if desired, be ground to optical flatness. In the preferred case the surface 42F should be as orthogonal as possible to the surface 40. Of less criticality is the orthogonality of the surface 42F to the surface 38, although it should likewise, be as as orthogonal as possible thereto.

Figure 2:
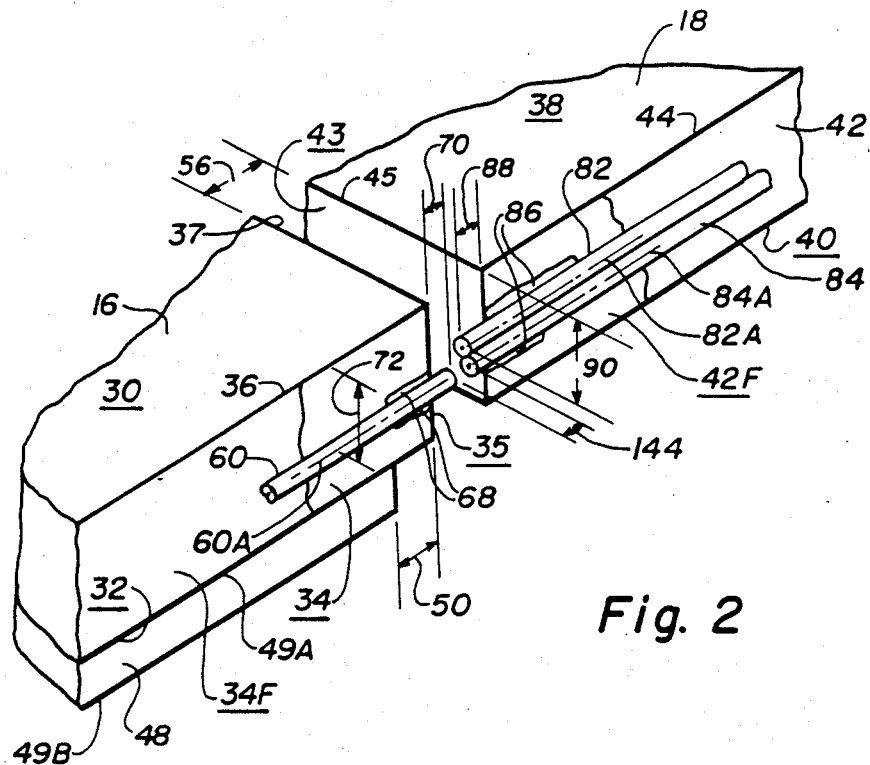
FIG. 2 is an enlarged perspective view of the switching members of the switch shown in FIG. 1 and, in particular, the region of the switching members near the ends of the aligned fibers.

The fixed member 16 is mounted to the upper surface 22 of the baseplate 20 via a spacer 48. The fixed member 16 overhangs the spacer by a predetermined clearance distance 50 (FIG. 2). The member 16 may be attached to the baseplate 20 using a suitable adhesive, such as an ultraviolet light curable, fastsetting epoxy. Suitable for use as the mounting epoxy is that sold by Electro-Lite Corp, Danbury, CN under number 82001 ELC 4480. The adhesive layer between the fixed member 16 and the spacer 48 is indicated by the reference numeral 49A while the adhesive layer between the spacer 48 and the baseplate 20 is indicated by the reference numeral 49B.

The movable member 18 is attached cantilever fashion to the baseplate 20 on a platform member 52 using the same adhesive as used to attach the fixed member 16 to the baseplate 20. A groove 54 is provided on the undersurface 40 of the movable member 18. The groove 54, which extends across the undersurface 40 parallel to the platform 52, localizes bending of the movable member 18 in a zone in the vicinity of the groove 54 and reduces the required bending force. The adhesive layer between the movable member 18 and the platform member 52 is indicated by the reference numeral 53A while the adhesive layer between the platform member 52 and the baseplate 20 is indicated by the reference numeral 53B. It should be understood that although the spacer member and the platform have been illustrated as separate members, it lies within the contemplation of the present invention that the baseplate may be formed in a manner in which the equivalents of the spacer and platform structures are integrally formed therewith.

When arranged in the described assembled relationship the movable member 18 is mounted with the surface 43 thereof disposed confrontationally with respect to the surface 35 on the fixed member 16 and with the optically flat portions 42F and 34F respectively being coplanar to each other. The lateral surfaces 35 and 43 of the members 16 and 18 are spaced a predetermined distance 56 (FIG. 2) from each other. The dimension of the spacing 56 is on the order of twenty-five to forty thousandths of an inch (0.025 to 0.040 inch). The movable member 18 is mounted for cantilevered movement with respect to the fixed member 16 from a first, unactuated, position to a second, actuated, position.

At least one optical fiber 60, preferably, but not necessarily of the single mode type, is mounted to the lateral surface 34 of the fixed member 16. The fiber 60 has an optically polished or cleaved end facet 60F thereon (FIG. 6) with at least a predetermined portion 60L of the fiber 60 adjhacent the facet 60F having a reference axis 60A extending therethrough. In the preferred implementation the fiber 60 is mounted to the optically flat portion 34F of the lateral surface 34 using an adhesive 68. Preferably the same UV curable adhesive discussed above is used to mount the fiber 60 to the surface 34. The end facet 60F of the fiber 60 extends a predetermined overhang distance 70 past the edge 37 on the fixed member 16. The distance 70 is on the order of a few fiber diameters so that the cantilevered portion of the fiber 60 will not sag. The axis 60A of the predetermined portion 60L of the fiber 60 is parallel to and spaced a predetermined distance 72 from the reference edge 36 of the fixed member 16. In the embodiment illustrated the fiber 60 is arranged so that it lies parallel to the edge 36 along the entire length of the fixed member 16, but it should be understood that it need not be so disposed. It is of importance that only that leading portion 60L of the fiber 60 adjacent the facet 60F lies parallel to the edge 36. Thus, for example, if it is desired, the fiber 60 may be curved at a point beyond the leading portion 60L. As will be understood by those will skill in the art, more than one fiber may be moutned to the fixed member 16, depending upon the application in which the switch 10 is utilized. In this event at least the portion(s) of the additional fiber(s) is(are) aligned parallel to the axis 60A of the fiber 60.

Figure 6:
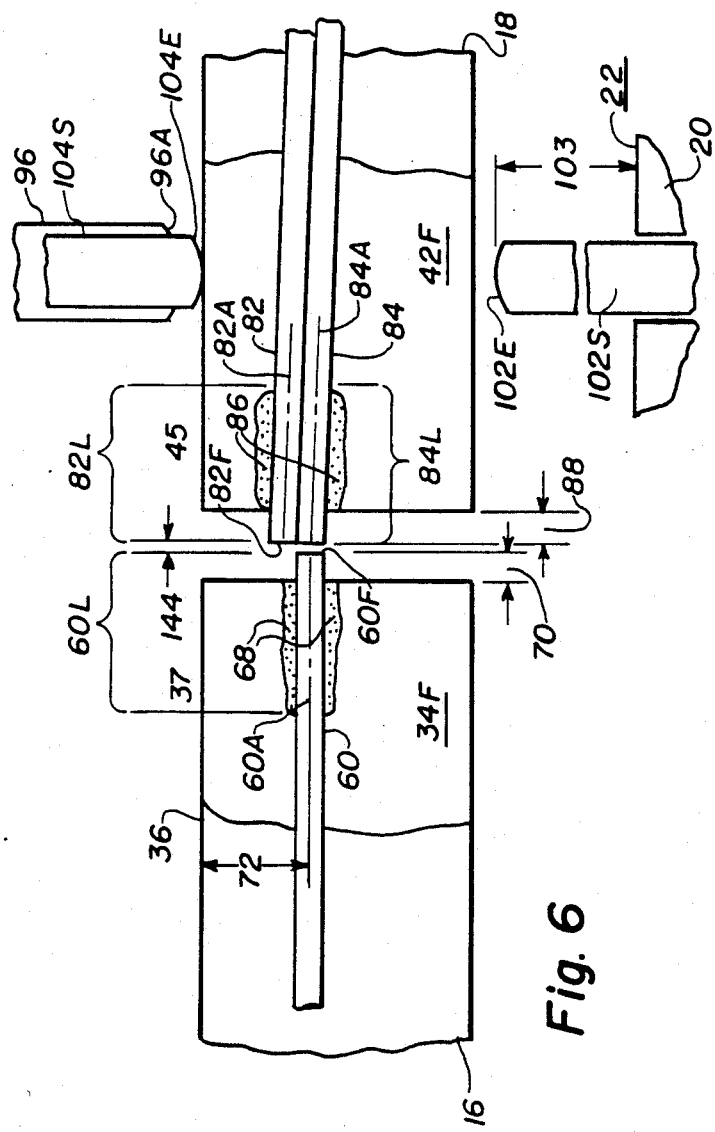
FIGS. 6 and 7 are side elevational views illustrating the relative positions of the fixed and the movable members with the latter respectively occupying the first, unactuated, position and the second, actuated, position.

As is shown in FIG. 6 with respect to the movable member 18 a first and a second optical fiber 82 and 84, respectively, each preferably but not necessarily of the single mode type, are mounted to the lateral surface 42 of the movable member 18. Each of the fibers 82 and 84 has an optically polished or cleaved end facet 82F and 84F, respectively, thereon, with at least a predetermined portion 82L, 84L, respectively of the fibers 82, 84 adjacent the facets 82F, 84F having a reference axis 82A, 84A extending therethrough. In the preferred implementation the fibers 82, 84 are mounted to the optically flat portion 42F of the lateral surface 42 using the same UV curable adhesive, as shown at 86. The end facets 82F, 84F of the fibers 82, 84 extend a predetermined overhang distance 88 past the edge 45 on the movable member 18. The overhang distance 88 is also preferably on the order of a few fiber diameters so that the cantilevered portions of the fibers will not sag. It is desired that the end facet 60F of the fiber 60 and the end facets 82F, 84F of the fibers 82 and 84 are as close as possible without touching throughout the movement of the movable member 18. In the preferred embodiment the ends 82F, 84F project the same distance 88 from the edge 45. The axes 82A, 84A of the respective portions 82L, 84L of the fibers 82, 84 are parallel to each other and slightly inclined to the edge 44 of the movable member 18, as will be discussed herein. The inclination is about one fiber diameter over the length, typically on the order of one inch, of member 18. The axis 82A of the fiber 82 is spaced a predetermined distance 90 from the reference edge 44 near the surface 43 of the movable member 18. It should be understood that in the embodiment illustrated the fibers 82, 84 are arranged so that they lie parallel to each other in a straight line inclined to the edge 44 along the majority of the length of the movable member 18, but they need not be so disposed. It is of importance only that portions 82L, 84L of the fibers 82, 84 adjacent the facets 82F, 84F thereof lie parallel to each other in the predetermined region 42F of the surface 42. It should be recognized that an antireflection coating of the facets 60F, 82F and 84F may be desirable.

Figure 3:
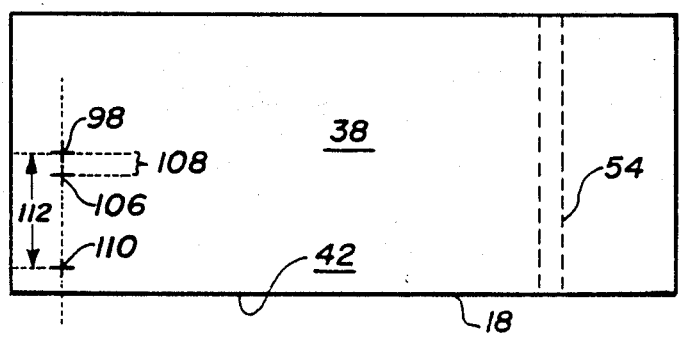
FIG. 3 is a plan view of the movable switch member of the switch of FIG. 1.

An actuator 94 (FIG. 1) for displacing the movable member from the first, unactuated, position, to a second, actuated, position is provided. The actuator is, in the preferred case, attached to a spacer 95 which is in turn mounted to the upper surface 30 of the fixed member 16. Preferably, the attachment of the actuator 94 to the spacer 95 and the mounting of the spacer to the fixed member 16 is effected using the same UV curable adhesive discussed above. The footprint of the spacer 95 on the surface 30 of the member 16 is indicated at reference character 97. The actuator 94 includes a solenoid having an armature 96 with an end 96A. The thickness of the spacer 95 is selected such that the end 96A of the armature 96 is spaced above the upper surface 38 of the movable member 18 when the actuator 94 is not asserted. When the actuator 94 is asserted the armature 96 extends downwardly therefrom and contacts the surface 38 of the movable member 18 at the contact point 98 (FIGS. 1, 3). Suitable for use as the actuator 94 is the device sold by Radio Shack Division of Tandy Corporation under model number 275-215A. Such an actuator is provided with an iron armature having a plastic covered tip. Dependent upon the materail properties of the movable member 18 materials other than plastic may be used for the armature tip.

The switch 10 further includes a first stop member 102 and a second stop member 104 (FIG. 1). The first stop member 102 is mounted on the lower surface 24 of the baseplate 20 using the same UV curable adhesive discussed above. The stop member 102 includes a body 102B with a flange 102F extending therefrom. The flange 102F is slotted at 102C to define a tab 102T that overlies a portion of the flange 102F. A hole 102H is drilled and tapped with a fine thread through the flange 102F and the tab 102T. A finely threaded stainless steel screw 102S having a spherically shaped end 102E thereon, projects through the hole 102H and through the access opening 28 in baseplate 20 so as to extend a distance 103 (FIGS. 6,7) above the upper surface 22 of the fixed member 20. The distance 103 is selected as discussed herein. The radius of the end 102E of the screw 102S is dependent upon the relative hardness of the material of the screw with respect to the hardness of the material of the movable member 18. Typically, the radius of the screw is on the order of one centimeter. To eliminate any movement or play between the screw 102S and flange 102F the tab 102T is bent slightly to displace or misalign the threads in the tab with respect to threads in the flange. Thus, when the screw 102S is threaded through the tab 102T and the flange 102F the tab acts as a spring to preload the screw 102S. It is desirable to position the stop member 102 such that the point 106 (FIG. 3) at which the end 102E of the screw 102S contacts the lower surface 40 of the movable member 18 is directly opposite the contact point 98. In actual practice a slight offset distance 108 is possible, but, consistent with the foregoing, the distance 108 should be minimized. The throw 96T (FIG. 7) of the armature, that is, the distance traversed by the tip 96A as it moves from the unasserted position to the asserted position, is selected to insure the member 18 is moved a sufficient distance to contact the stop 102 when the actuator 94 is asserted.

The second stop member 104 (FIG. 1) is mounted on the upper surface 30 of the fixed member 16, again using the same UV curable adhesive discussed above. The footprint of the stop 104 on the surface 30 of the member 16 is indicated at reference character 105. Like the stop member 102, the stop member 104 includes a body 104B with a flange 104F extending therefrom. The flange 104F is slotted at 104C to define a tab 104T that overlies a portion of the flange 104F. A hole 104H is drilled and tapped with a fine thread through the flange 104F and the tab 104T. A finely threaded stainless steel screw 104S having a spherical shaped end 104E thereon, extends through the hole 104H so as to project a distance 106 (FIG. 6) below the flange 104F. The magnitude of the distance 106 is adjusted as described herein. The radius of the end 104E of the screw 104S is dependent upon the relative hardness of the material of the screw 104S with respect to the hardness of the material of the movable member 18. To eliminate any movement or play between the screw 104S and flange 104F the tab 104T is bent slightly to misalign the threads therein with respect to threads in the flange to preload the screw 104S analagously to the arrangement discussed in connection with the screw 102S. Because the stop 104 is mounted on the fixed member 16 next to the actuator 94 the point 110 (FIG. 3) at which the end 104E of the screw 104S contacts the upper surface 38 of the movable member 18 is offset by a distance 112 from the contact point 98. The contact point 110 is thus chosen to lie adjacent the lateral surface 42 upon which the fibers 82, 84 are attached to the movable member 18. It lies within the contemplation of this invention to dispose the armature 96 and the stop 104 so as to act coaxially with each other such that they contact the movable member 18 at substantially the same point.

In the preferred embodiment both the fixed member 16 and the movable member 18 as well as the spacer 48, the platform 52 and the baseplate 20 are fabricated from a material that (1) exhibits a low thermal expansion coefficient, (2) has an isotropic thermal expansion characteristic, (3) the strain responds linearly to an applied stress and the strain immediately returns to zero upon removal of the stress, and (4) is transparent to both visible and ultraviolet radiation. The preferable material is a potash, soda, zinc borosilicate glass such as that sold by Corning Glass Works, Inc., Corning, New York, as Corning Code:0211 although other glass types and fused quartz may be used. By "low" it is meant a coefficient of less than 10 ppm/° C. The low thermal expansion coefficient combined with the isotropic expansion characteristic insures that the dimension 56 (FIG. 2) of the gap between the fixed and movable members remains constant as the switch experiences a change in ambient temperture. Since the preferred material closely obeys Hooke's Law (i.e., the strain responds linearly to an applied stress and the strain immediately returns to zero upon removal of the stress) when the movable member is deflected by the assertion of the actuator it will return to precisely the same initial position when the actuator is not asserted. This is important to insure repeatable operation of the switch. The tranparency to both visible and UV light has importance in the manufacturability of the switch, as will be discussed.

Figure 8:
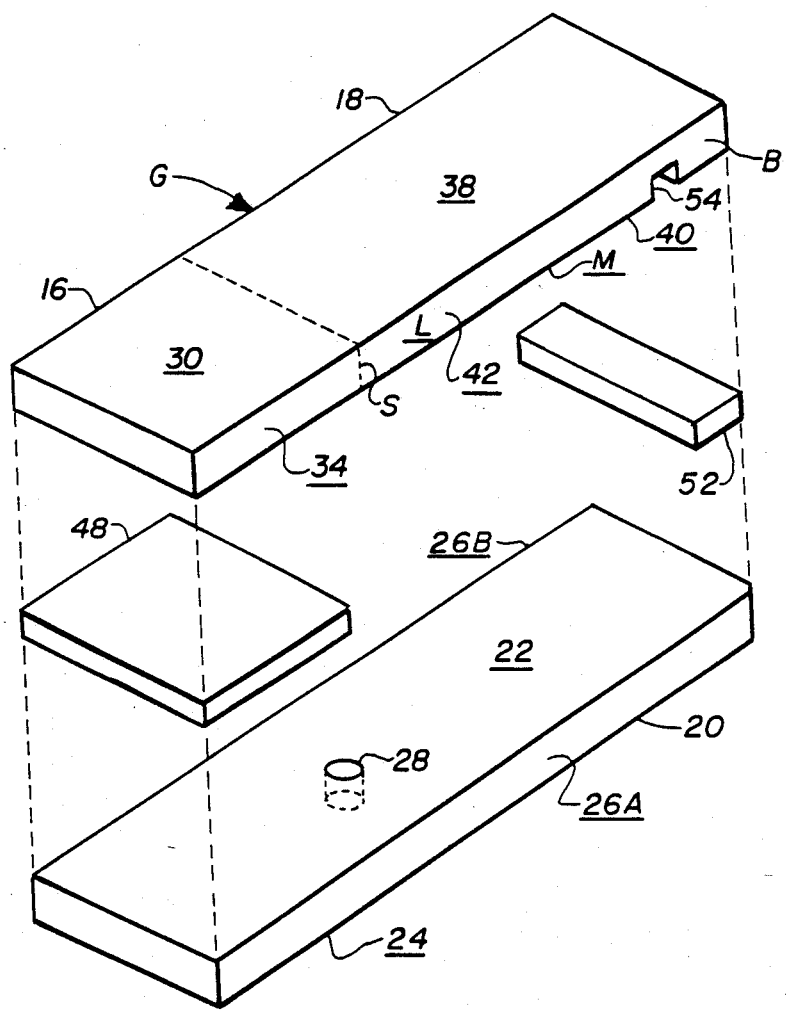
FIG. 8 is an exploded perspective view showing the components of the switch during fabrication thereof.

The method of manufacturing the switch of the present invention may be understood with reference to FIG. 8. The rectanguloid glass member forming the baseplate 20 is drilled to provide the access opening 28 therein. To form the fixed and movable switching members a major surface M and a lateral surface L of a rectanguloid glass member G are optically polished and ground to a predetermined optically flat finish, preferably to a finish better than one wavelength per inch. The lateral surface L is ground orthogonal to the major surface M. A zone of bending B is defined in the member G by the grinding a groove 54 in the surface M. The spacer 48 and the platform 52 are mounted to the baseplate 20 and the member G mounted to the spacer 48 and the platform 52 using the UV curable adhesive mentioned above. A layer of the adhesive is provided over the upper and lower surface of each of the spacer and the platform. The baseplate, spacer, platform and glass member G are brought together along the dotted lines to lie in their desired relationship and clamping pressure is applied by a suitable fixture. The clamping force is adjusted to spread the adhesive uniformly across the entire interfaces between the spacer 48 and the member G and the baseplate 20 and between the platform 52 and the member G and the baseplate 20. As the clamping pressure is applied the spread of the adhesive is visually observed through the members to insure uniformity. The clamping pressure is relieved, the adhesive inspected to verify uniform thickness so that the members are parallel, and no twisting or bending stresses have been introduced. The adhesive is cured under ultraviolet light for an appropriate period.

Next the glass member G is sawed along the line S using a suitable cutting device, such as a diamond saw, thereby defining the fixed member 16 and the movable member 18. Since the lateral surface L of the glass member G is optically flat, both the lateral surface 34 on the fixed member 16 and the lateral surface 42 on the movable member 18 are optically flat. Moreover, since these surfaces were once integral, they are, after sawing, coplanar. The actuator 94 and the stops 102 and 104 are thereafter mounted in the positions discussed above.

With reference now to FIGS. 4A, 4B, 5A, 5B and 5C the manner in which the fibers are attached to the respective fixed and movable members may be more clearly understood. It should be noted that in the preferred case all of the fibers 60, 82, and 84 are positioned and the adhesive cured in a simultaneous operation using a alignment fixture 114. The fixture 114 is formed of two attached metal pieces 114A and 114B. The fixture 114 could be made of glass or suitable rigid material. The alignment fixture 114 has surfces 118, 120 and 122. The surfaces 118, 122 are preferably optically flat. The surfaces 118 and 120 are treated with a release agent, such as silicone Rubber Adhesive Sealant No. 10-150 made by GC Electronics, for a purpose to be made clearer herein. The surfaces 120 and 122 on the fixture 114 are arranged to lie parallel to the surfaces 34 and 30, respectively, on the fixed member 16 and to the surfaces 42 and 38, respectively, on the movable member 18. The alignment fixture 114 has a micrometer screw 116 extending therethrough, used to displace the movable member 18 during assembly.

Figure 4A:
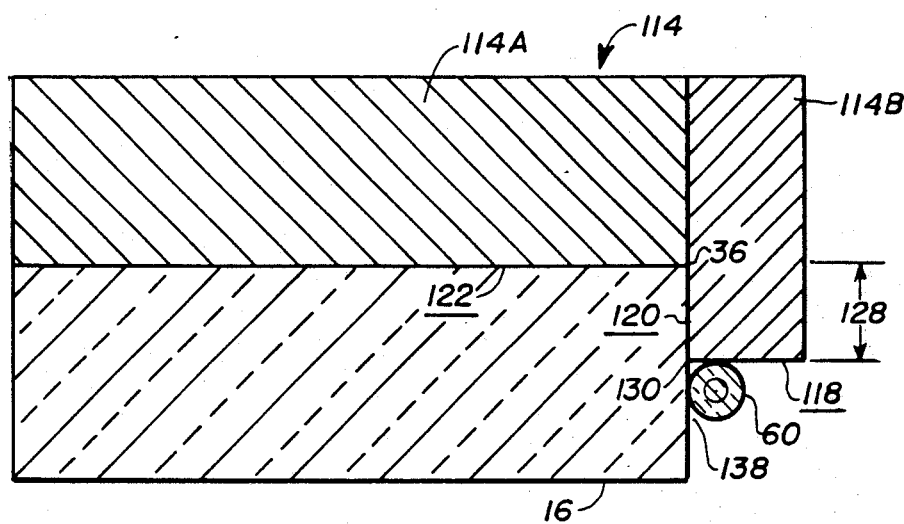
FIGS. 4A and 4B are side elevational views, taken along section lines 4—4 in FIG. 1, respectively showing the alignment of a mounting fixture and a fiber with respect to the edge of the fixed switch member during assembly and the fiber as finally attached thereto.
Figure 5A:
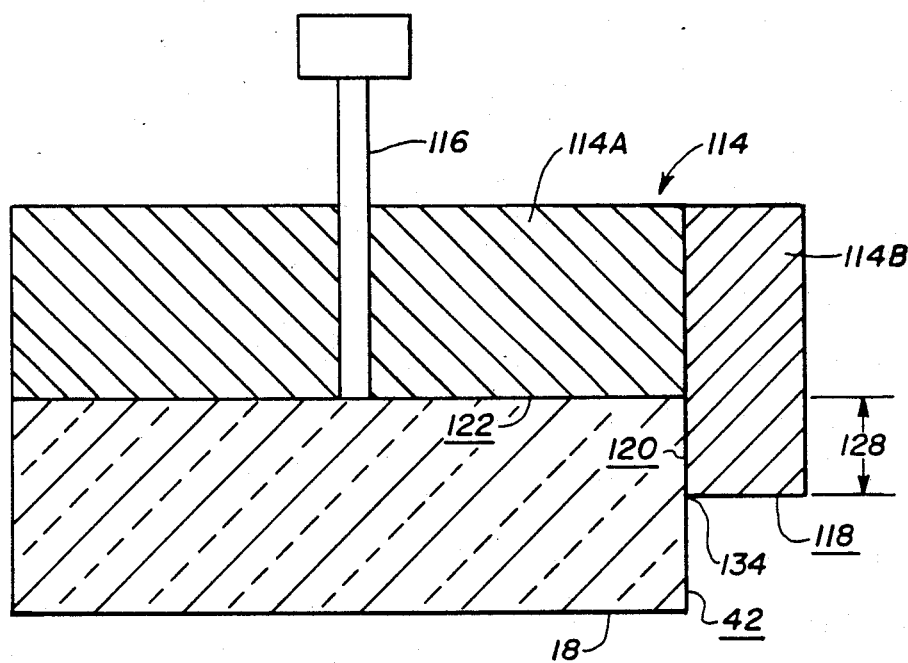
FIGS. 5A, 5B and 5C are side elevational views, taken along section lines 5—5 in FIG. 1, respectively showing the alignment of a mounting fixture to the movable switch member, the alignment of the fibers to the edge of the displaced movable switch member during assembly, and the fibers as finally attached thereto.

With reference to FIGS. 4A and 5A, to position the fiber 60 to the lateral surface 34 of the fixed member 16 (FIG. 4A) and to position the fibers 82, 84 to the movable member 18 (FIG. 5A) the alignment fixture 114 is brought into predetermined position with respect to both the members 16 and 18. As seen from FIG. 4A when the surfaces 120 and 122 of the fixture 114 are placed into contact with the respective surfaces 34 and 30 of the fixed member 16 the surface 118 lies a distance 128 from the reference edge 36. The intersection of the surface 118 on the fixture 114 and the lateral surface 34 of the fixed member 16 forms a corner 130.

Correspondingly, as seen in FIG. 5A, when the surfaces 120 and 122 of the fixture 114 are placed into contact with the respective surfaces 42 and 38 of the movable member 18 the surface 118 lies the same distance 128 from the reference edge 44. The intersection of the surface 118 and, as is seen in FIG. 5B, the lateral surface 42 of the movable member 18 forms a corner 134.

As seen in FIG. 4A when the fiber 60 is positioned in the corner 130, typiclly with a one to five gram clamping force, so that it lies tangentially to both the surfaces 34 and 118, the axis 60A of the fiber 60 is precisely positioned at the predetermined distance 72 from the reference edge 36. It should be understood from the foregoing that the distance 128 plus the radius of the fiber 60 is equal to the offset distance 72.

Figure 5B:
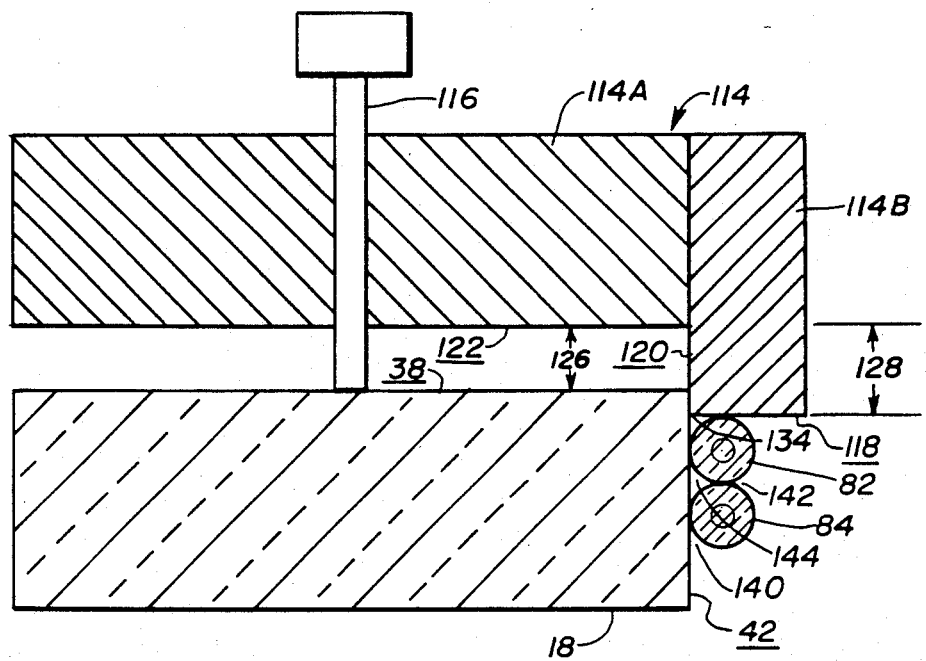

As is best seen in FIG. 5B the micrometer screw 116 is adjusted to displace the free end of the movable member 18, that is the unattached end adjacent to the fixed member 16, by a distance 126, equal to 1.25 times the diameter of fiber 60. Typically, for a single mode fiber, the distance 126 is on the order of one hundred fifty (150) microns. As will be understood, the displacement of movable member 18 by one (1.00) fiber diameter causes fiber 84 to be aligned with fiber 60 when movable member 18 is in its unactuated position. The additional one-fourth (0.25) fiber diameter of displacement preloads the member 18 against the stop 104 when the member 18 is in the unactuated position.

When the fiber 82 is positioned in the corner 134, typically with a one to five gram clamping force, so that it lies tangentially to both the surfaces 42 and 118, the axis of the fiber 82 is precisely positioned at the predetermined distance 90 from the reference edge 44. It may be understood from the foregoing that the distance 128 plus the radius of the fiber 82 minus the displacement distance 126 is equal to the offset distance 90.

As seen in FIG. 5B the fiber 84 is next tangentially positioned in adjacency to the fiber 82, with the axis 84A of the fiber 84 (at least in the leading portion 84L) being parallel to the axis 82A of the fiber 82.

With the fiber 60 so positioned and the fixture 114 still in place a droplet of adhesive, such as the UV curable adhesive referenced above, is applied at the point 138 between the fiber 60 and the surface 34. Capillary action draws the flowable adhesive under the fiber 60.

With the fibers 82 and 84 positioned as shown in FIG. 5B and with the fixture 114 still in place a first droplet of the same adhesive is applied at the point 140 between the fiber 84 and the surface 42 and a second droplet of the adhesive is applied at a point 142 between the fibers 82 and 84. Capillary action draws the flowable adhesive under and between the fibers 82 and 84 and into the space 144 therebetween.

Figure 4B:
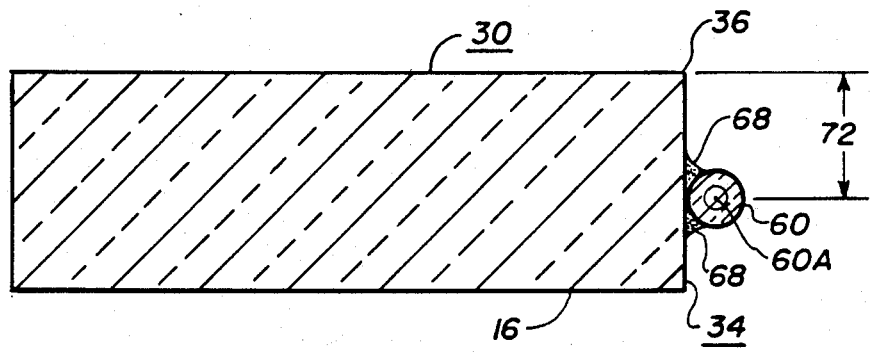
Figure 5C:
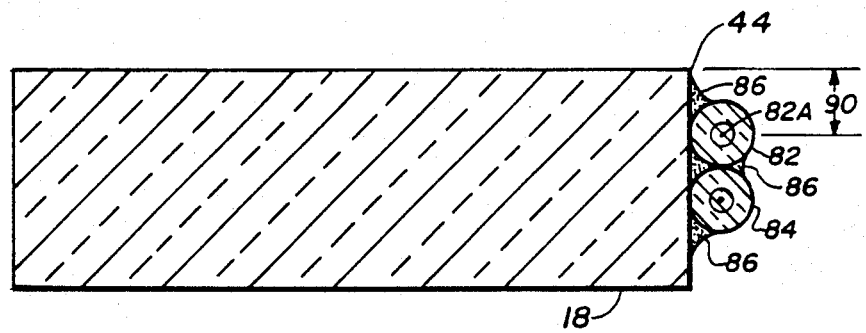

The adhesive is cured. When cured the fixture 114 is removed. The presence of the release agent prevents the adhesive from adhering to the surfaces 118 and 120 of the fixture 114. The resulting structure of the fixed member 16 is shown in FIG. 4B, while the resulting structure for the movable member is shown in FIG. 5C. The cured adhesive fillets are again indicated by the characters 68 and 86, respectively.

Figure 7:
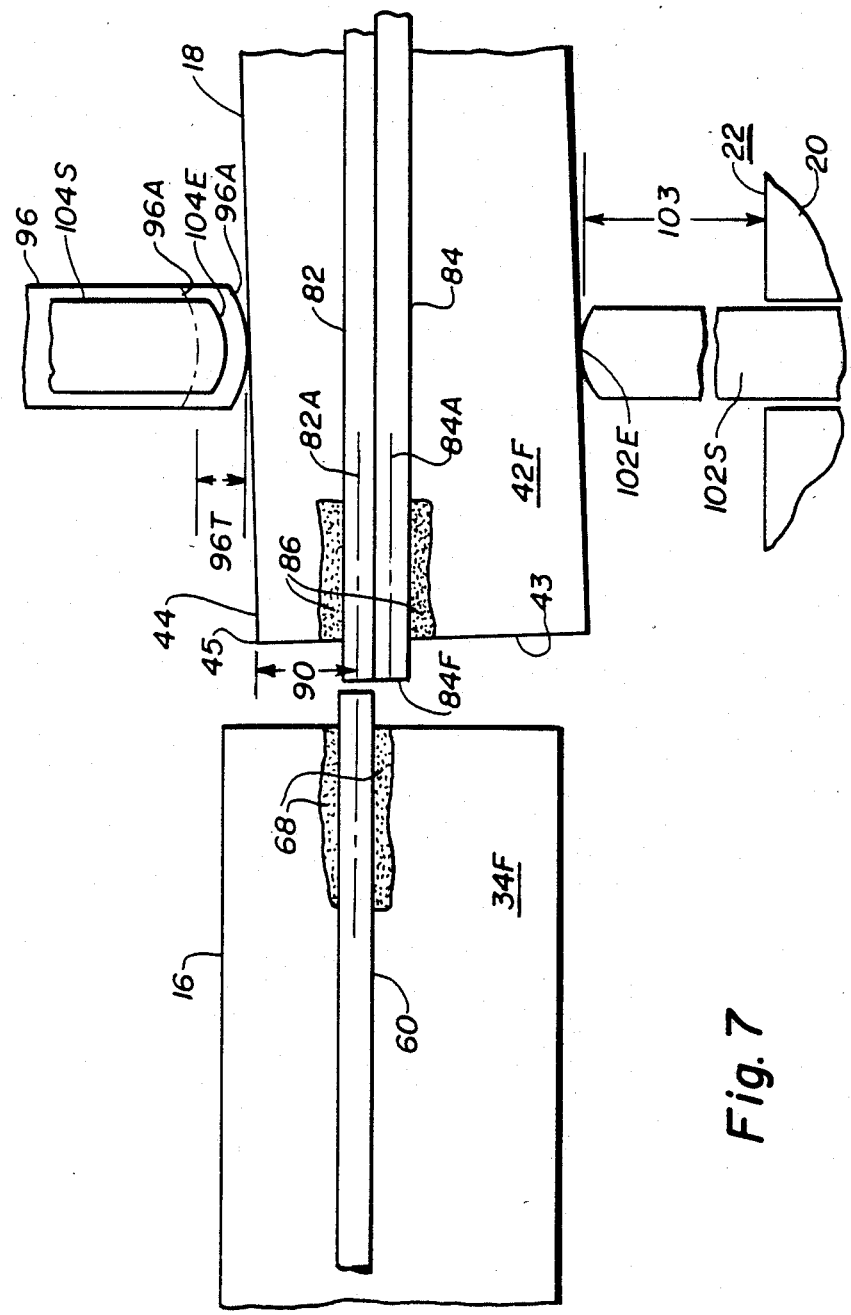

Having precisely attached the fibers with respect to the appropriate reference edges the stops 102 and 104 are adjusted. As seen in FIG. 6 the stop 104 is adjusted so that the axis of one of the fibers 82 or 84, for example, the axis 84A of the fiber 84, is substantially collinear with the axis 60A of the fiber 60. Since, as discussed above, the fiber 84 is inclined from the edge 44 the axis 84A intersects the axis 60A in the gap between the facets 60F and 84F, and thus the term "substantially collinear" is used to describe this relationship between the axes of the fibers 84 and 60. This alignment occurs with the actuator 94 not asserted and with the movable member 18 in the unactuated position. Similarly, as shown in FIG. 7 the actuator 94 is then energized, the movable member displaced to the actuated position, and the stop 102 is adjusted so that the axis of the other fiber, i.e., the axis 82A of the fiber 82, lies as close to collinear as possible with the axis 60A of the fiber 60. However, even if exact collinearity cannot be achieved between the axes 82A, 60A, these axes are still substantially collinear since the axis 82A intersects the axis 60A in the gap between the fiber end facets 60F and 82F. During the adjustment described, to verify that the fibers are collinearly aligned, light is introduced into the fiber 60 at the free end thereof and the intensity of the light at the free ends of the fibers 82 and 84, as the case may be, is measured. The stops are adjusted for maximum light transmission.

The point to be noted is that the fibers are mounted on the members such that the fibers are in optimal alignment with respect to each other. In one position, the axes of the fibers, e.g. 82A, 60A, are as close to collinearity as is physically possible. In a second position, the axes 84A, 60A are substantially collinear, owing to the fact that the fiber 84 is mounted parallel to the fiber 82. (Since the axes 82A, 84A are parallel, they cannot both optimally align with the axis 60A).

Once the adjustments are completed, the finished switch is packaged, either singly or plurally, into a suitable hermetically sealed enclosure.

In operation, assertion or nonassertion of the actuator 94 brings the axis 82A or 84A of the fiber 82 or 84, respectively, into collinearity with axis 60A of the fiber 60.

Those skilled in the art, having the benefit of the teachings of the present invention may impart numerous modifications thereto. It should be understood that such modifications are to be construed as lying within the scope of the present invention, as defined by the appended claims.

What is claimed is:

1. A fiber optic switch comprising:
   a baseplate;
   a fixed member mounted to the baseplate by an adhesive, the fixed member having a lateral surface that is optically flat over a predetermined portion thereof;
   movable member having a first and a second end, the movable member being mounted at the second end thereof to the baseplate by an adhesive, the movable member having a lateral surface that is optically flat over a predetermined portion thereof, the movable member being mounted such that the optically flat portion thereof is coplanar with the optically flat portion of the fixed member,
   a first fiber having an end face thereon, a predetermined portion of the first fiber adjacent to the end face thereof being mounted on the optically flat portion of the lateral surface of the fixed member, the predetermined portion of the fiber having an axis therethrough;
   a second fiber mounted on the optically flat portion of the lateral surface of the movable member adjacent to the first end thereof, the second fiber having an end face thereon, a predetermined portion of the second fiber adjacent to the end face thereof having an axis therethrough;
   the movable member being movable in a cantilevered fashion with respect to the fixed member from a first position to a second position such that when the movable member occupies one of its positions the axes of the fibers align collinearly; and
   an actuator physically contacting the movable member for displacing the same from the first to the second position;
   the fixed and the movable members being fabricated from a material that (1) exhibits a low thermal expansion coefficient, (2) has an isotropic thermal expansion characteristic, (3) the strain responds linearly to an applied stress and the strain immediately returns to zero upon removal of the stress and (4) is transparent to both visible and ultraviolet radiation.

2. The fiber optic switch of claim 1 further comprising:
   a third fiber mounted on the lateral surface of the movable member, the third fiber having an end face thereon, a predetermined portion of the third fiber adjacent to the end face thereof having an axis therethrough, the predetermined portions of the second and the third fibers being mounted so as to lie adjacent to each other and such that the axes of the predetermined portions of the second and third fibers are disposed in parallel with each other, when the movable member occupies the other of its positions the axes of the first and third fibers align substantially collinearly.

3. THe fiber optic switch of claim 2 further comprising:
a stop member to limit the motion of the movable member.

4. The fiber optic switch of claim 1 further comprising:
a stop member to limit the motion of the movable member.

5. The fiber optic switch of claim 4 wherein the movable member has a first and a second major surface thereon,
the actuator being disposed so as to act against the first major surface at a predetermined point thereon,
the stop being disposed so as to act against the second major surface of the movable member at a point thereon directly opposite the predetermined point at which the actuator acts against the first major surface of the movable member.

6. The fiber optic switch of claim 3 wherein the movable member has a first and a second major surface thereon,
the actuator being disposed so as to act against the first major surface at a predetermined point thereon,
the stop being disposed so as to act against the second major surface of the movable member at a point thereon directly opposite the predetermined point at which the actuator acts against the first major surface of the movable member.

7. The fiber optic switch of claim 4 wherein
the movable member having a first and a second major surface thereon,
the actuator being disposed so as to act against the first major surface at a predetermined point thereon,
the stop being disposed so as to act against the first major surface at a point thereon spaced from the predetermined point against which the actuator acts.

8. The fiber optic switch of claim 3 wherein
the movable member having a first and second major surface thereon,
the actuator being disposed so as to act against the first major surface at a predetermined point thereon,
the stop being disposed so as to act against the first major surface at a point thereon spaced from the predetermined point against which the actuator acts.

9. The fiber optic switch of claim 8 further comprising a second stop, the second stop disposed so as to act against the second major surface of the movable member at a point thereon directly opposite the predetermined point at which the actuator acts against the first major surface of the movable member.

10. The fiber optic switch of claim 7 further comprising a second stop, the second stop disposed so as to act against the second major surface of the movable member at a point thereon directly opposite the predetermined point at which the actuator acts against the first major surface of the movable member.

11. The fiber optic switch of claim 2 wherein the movable member has a zone of bending disposed adjacent to the second end thereof.

12. The fiber optic switch of claim 1 wherein the movable member has a zone of bending disposed adjacent to the second end thereof.

13. The fiber optic switch of claim 12 wherein the movable member has a first and second major surface thereon,
the actuator being disposed so as to act against the first major surface at a predetermined point thereon,
the zone of bending being defined by a groove disposed in the second major surface of the movable member, 14. The fiber optic switch of claim 11 wherein
the movable member has a first and second major surface thereon,
the actuator being disposed so as to act against the first major surface at a predetermined point thereon,
the zone of bending being defined by a groove disposed in the second major surface of the movable member.

15. The fiber optic switch of claim 4 wherein the fixed and movable members are fabricated of borosilicate glass.

16. The fiber optic switch of claim 3 wherein the fixed and movable members are fabricated of borosilicate glass.

17. The fiber optic switch of claim 2 wherein the fixed and movable members are fabricated of borosilicate glass.

18. The fiber optic switch of claim 1 wherein the fixed and movable members are fabricated of borosilicate glass.

19. A method for fabricating a fiber optic switch comprising the steps of:
(a) grinding and polishing at least a portion of a first surface of a member to a finish that is optically flat, the first surface being substantially orthogonal with respect to a second surface of the member, the member having a first and a second end thereof;
(b) mounting the member along the second surface at each end thereof to a baseplate;
(c) sawing the member into first and second portions, at least one of the portions being movable with respect to the baseplate; and
(d) attaching a fiber to each of the portions so that the axes of the fibers align collinearly when the movable portion occupies a predetermined position with respect to the other portion.

20. The method of claim 19 wherein the member is fabricated from a material that (1) exhibits a low thermal expansion coefficient, (2) has an isotropic thermal expansion characteristic, (3) the strain thereof responds linearly to an applied stress, and (4) is transparent to both visible and ultraviolet radiation and wherein the mountng step (b) itself comprises the steps:
(b1) applying adhesive between the second surface and the baseplate at each end of the member;
(b2) contacting the member to the baseplate;
(b3) applying pressure to the member and the baseplate to spread the adhesive;
(b4) relieving the pressure and inpecting the adhesive to verify uniform spreading of the adhesive to a uniform thickness at each end of the member;
(b5) curing the adhesive.

21. The product produced by the process of claim 20.

22. The product produced by the process of claim 19.

* * * * *